United States Patent
Yokoi et al.

(10) Patent No.: US 7,370,531 B2
(45) Date of Patent: May 13, 2008

(54) DETECTION CIRCUITS, DETECTION METHOD AND SYSTEMS OF MEASURING PHYSICAL QUANTITIES

(75) Inventors: Shoji Yokoi, Nagoya (JP); Yoshihiro Kobayashi, Komagane (JP); Masayuki Takahashi, Nasushiobara (JP)

(73) Assignees: NGK Insulators, Ltd., Nagoya (JP); Seiko Epson Corporation, Shinjuku-Ku (JP); Nippon Precision Circuits Inc., Koto-Ku (JP)

( * ) Notice: Subject to any disclaimer, the term of this patent is extended or adjusted under 35 U.S.C. 154(b) by 0 days.

(21) Appl. No.: 11/039,060

(22) Filed: Jan. 19, 2005

(65) Prior Publication Data

US 2005/0204813 A1    Sep. 22, 2005

(30) Foreign Application Priority Data

Jan. 20, 2004    (JP)    ............................ P2004-011580

(51) Int. Cl.
*G01C 19/00*    (2006.01)
(52) U.S. Cl. .................... 73/504.12; 73/73; 73/504.03; 73/514.02
(58) Field of Classification Search ............. 73/504.12, 73/504.02, 504.03, 504.04, 511, 514.01, 514.02
See application file for complete search history.

(56) References Cited

U.S. PATENT DOCUMENTS

| | | | |
|---|---|---|---|
| 5,677,486 A | | 10/1997 | Nakamura et al. ....... 73/504.14 |
| 5,783,973 A | * | 7/1998 | Weinberg et al. ............. 331/35 |
| 5,796,231 A | | 8/1998 | Kyodo |
| 6,450,030 B1 | * | 9/2002 | Fujimoto .................. 73/504.04 |
| 6,564,638 B1 | * | 5/2003 | Ebara ....................... 73/504.14 |
| 6,690,740 B1 | * | 2/2004 | Mattisson et al. ........... 375/295 |
| 6,722,198 B1 | * | 4/2004 | Konaka ......................... 73/511 |
| 7,107,841 B2 | * | 9/2006 | Mori ........................ 73/504.12 |
| 2003/0039325 A1 | * | 2/2003 | Watanabe .................... 375/346 |
| 2004/0182184 A1 | * | 9/2004 | Yokoi et al. ............... 73/866.1 |
| 2005/0011267 A1 | * | 1/2005 | Kikuchi ....................... 73/649 |
| 2005/0204814 A1 | * | 9/2005 | Yokoi et al. ............. 73/504.12 |
| 2005/0243959 A1 | * | 11/2005 | Ashley et al. .............. 375/364 |

FOREIGN PATENT DOCUMENTS

| | | |
|---|---|---|
| JP | 60-188809 | 9/1985 |
| JP | 04-297874 | 10/1992 |
| JP | 8-136267 | 5/1996 |
| JP | 09-033258 | 2/1997 |
| JP | 09-056194 | 2/1997 |
| JP | 09-105637 | 4/1997 |
| JP | 11-044540 | 2/1999 |
| JP | 11-281372 | 10/1999 |
| JP | 2003-087057 | 3/2003 |

* cited by examiner

*Primary Examiner*—Hezron Williams
*Assistant Examiner*—Jacques M. Saint-Surin
(74) *Attorney, Agent, or Firm*—Burr & Brown

(57) ABSTRACT

A detection circuit 30 has a unit 30a for inputting a signal to be detected by synchronized wave detection, a unit 30b for inputting a standard signal for the signal to be detected and a unit 30c for inputting an offset signal applied on the signal to be detected. The offset signal is superimposed on the signal to be detected, which is then subjected to synchronized wave detection based on the standard signal.

6 Claims, 11 Drawing Sheets

Fig. 4
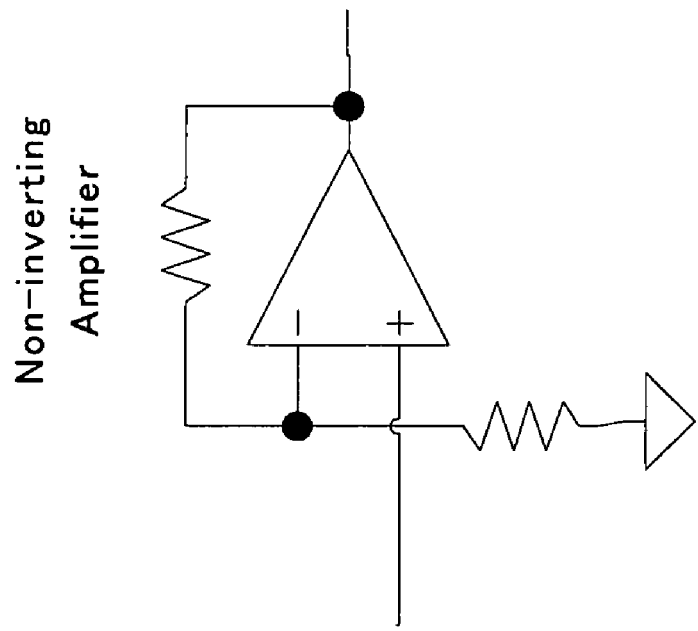
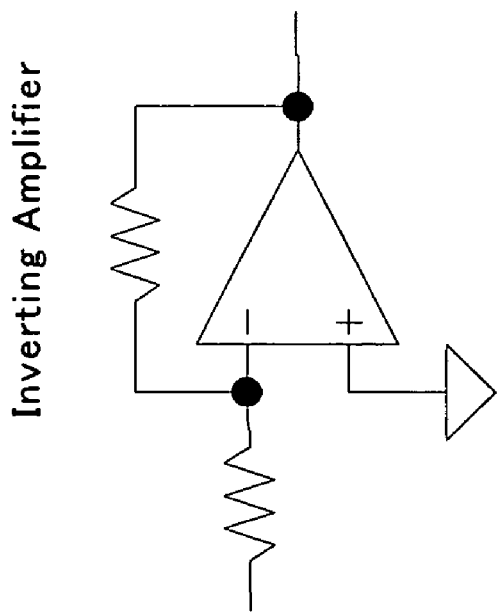

DETECTION CIRCUITS, DETECTION METHOD AND SYSTEMS OF MEASURING PHYSICAL QUANTITIES

This application claims the benefit of Application Ser. No. P2004-11580, filed Jan. 20, 2004, the entirety of which is incorporated herein by reference.

BACKGROUND OF THE INVENTION

1. Field of the Invention

The present invention provides a detection circuit, detection method and systems of measuring physical quantities such as a vibratory gyroscope or the like.

2. Related Art Statement

The inventors have studied various applications of a vibratory gyroscope. For example, it has been studied to use a vibratory gyroscope as a turning angular rate sensor employed in a vehicle control system of an automobile body based on a vehicle turning rate feedback system. Such a system detects the direction of a steering wheel itself by a turning angle of the steering wheel. Simultaneously, the turning rate of the car vehicle is detected by the vibratory gyroscope. The system finds a difference by comparing the direction of the steering wheel with the actual body turning velocity, and attains a stable vehicle control by correcting a wheel torque and a steering angle on the basis of this difference. The applicant filed Japanese patent publication 11-281372 A mainly disclosing a vibratory gyroscope suitable for horizontal mounting using a planar vibrator.

When a vibratory gyroscope is produced, a self-oscillating circuit is used to excite driving vibration in a driving vibration arm made of, for example quartz. Further, output voltage from a detection electrode on a vibrator is processed to obtain a value of voltage corresponding to a turning angular rate. Such circuit is disclosed in Japanese patent publication 11-44540A and 2003-87057A.

DISCLOSURE OF THE INVENTION

According to prior arts, self-oscillating and detection circuits have been formed on discrete IC chips. Such method requires many manufacturing steps for the completion of the fabrication. The inventors have thus studied the method of mass production of driving and detection circuits by forming the self-oscillating and detection circuits on a monolithic IC chip.

When a monolithic type IC is selected as an IC for a gyroscope sensor, a process for performing IC fabrication is categorized into bipolar and CMOS processes. CMOS process is preferred for measuring weak current generated in a detecting electrode. If the above fabrication is performed by CMOS process, however, noise in the detection signal is large and, in particular, 1/f noise generated in the detection circuit becomes considerable.

FIG. 1 is a block diagram showing an example of a detection circuit. Detection signals from detection means 12A and 12B provided on a vibrator 11 are amplified using charge amplifiers 13A, 13B, respectively. The difference of the output signals is amplified with a differential amplifier 14, and then passed through an amplifier 15. On the other hand, a part of a driving signal is derived and the thus derived signal is supplied to a phase shifter 30 so that the output signal from the vibrator 1 is passed through the detection circuit 16 for phase detection. As a result, unnecessary leakage signal should be cancelled or at least reduced in the output signal after the phase detection. The output signal after the phase detection is passed through a low pass filter 17 and an amplifier 18.

The vibration components in the directions of gyroscope signal and the leakage signal at S4 position shown in FIG. 1 are divided as graphs S4 shown in FIG. 2. The phase detection of the gyroscope signal results in the wave from shown as S5. The thus obtained signal is passes through a low pass filter 17 to obtain a direct current signal shown as S6. The amplitude of the signal is lowered after the gyroscope signal is subjected to the phase detection and low pass filter. The direct current signal is thus usually amplified with an amplifier 18, to which a signal from an offset adjusting circuit 19 is added. The output after the amplification is measured at an output terminal 20.

It is proved that, for example, 1/f noise may be problematic. 1/f noise is a noise of a low frequency and mainly generated in an amplifier. It is thus necessary to reduce the amplification factor of the noise in the downstream of the low pass filter 17.

For example, as shown in FIG. 3, it is provided that a non-inverting amplifier 21 and an inverting amplifier 22 are provided in the downstream of the low pass filter 17. Amplifiers include inverting and non-inverting amplifiers. It is now provided that the noise of the amplifier is assigned to "Vn" and the gain of the amplifier circuit is assigned to "A". The output noise of the inverting amplifier is $[(A+1) \times Vn]$, and that of the non-inverting amplifier is $[A \times Vn]$. It is thus preferred to use a non-inverting amplifier on the viewpoint of reducing the noise.

It is now provided that the input impedances of the inverting amplifiers 22 from the non-inverting amplifier 21 and an offset adjusting D/A 19 are made the same with each other in a circuit shown in FIG. 3, the 1/f noise is $Vn \times A + Vn \times (2A+1) = Vn \times (3A+1)$. It is provided that, for example, "A"=4, the 1/f noise in the downstream of the low pass filter in the circuit of FIG. 3 becomes 13Vn. It is desired to move the amplifier having an amplification factor of "A" in the upstream as possible.

The inventors have tried to move the amplifier having an amplification factor of "A" in the upstream, as shown in FIG. 5. In this case, an offset signal is input into the signal of the amplifier 23. In this case, if the impedances of the inverting amplifier 23 from the low pass filter 17 and from the offset adjusting D/A 19 are made the same with each other, the 1/f noise becomes $Vn \times (2A+1) + Vn \times 2 = Vn \times (2A+3)$. It is now provided that, for example, "A"=4, the 1/f noise becomes 11 Vn. The noise level itself is lower in the non-inverting amplifier than in the inverting amplifier. The non-inverting amplifier has, however, a narrower input voltage range. For performing the offset adjustment, a wider range of the input voltage of the amplifier is necessary, so that the use of the inverting amplifier having a higher noise level is needed. It is thus difficult to reduce the 1/f noise in the detecting circuit.

An object of the present invention is to reduce the noise in signal after the amplification in amplifying signal after synchronized wave detection.

The present invention provides a wave detection circuit comprising a unit for inputting a signal to be detected by synchronized wave detection, a standard signal input unit for inputting a standard signal for the signal to be detected and an offset signal input unit for inputting an offset signal applied to the signal to be detected, wherein the signal to be detected is subjected to synchronized wave detection based on the standard signal after the offset signal is superimposed on the signal to be detected.

The present invention further provides a detection method comprising the steps of:
  superimposing an offset signal on a signal to be detected by synchronized wave detection; and
  then subjecting the signal to be detected to synchronized wave detection based on a standard signal.

The present invention further provides a system for measuring a physical quantity based on a detection signal using a vibrator, a driving circuit exciting a driving vibration in the vibrator and a detecting circuit outputting the detection signal from the vibrator, the detecting circuit comprising a wave detection circuit comprising a unit for inputting a signal to be detected by synchronized wave detection, a standard signal input unit for inputting a standard signal for the signal to be detected and an offset signal input unit for inputting an offset signal applied to the signal to be detected, wherein the signal to be detected is subjected to synchronized wave detection based on the standard signal after the offset signal is superimposed on the signal to be detected.

The inventors have reached the idea of a circuit for superimposing an offset signal on a signal to be detected and subjecting the signal to be detected to synchronized wave detection. It is thus possible to use a non-inverting amplifier having a narrower range of input voltage as an amplifier for amplifying a signal after synchronized wave detection. Such non-inverting amplifier has a lower 1/f noise compared with an inverting amplifier so that the noise can be considerably reduced.

BRIEF DESCRIPTION OF THE DRAWINGS

FIG. 4 is a circuit diagram showing a construction example of inverting and non-inverting amplifiers.

PREFERRED EMBODIMENTS FOR CARRYING OUT THE INVENTION

The circuit for synchronized wave detection according to the present invention will be described below.

Figure 6:
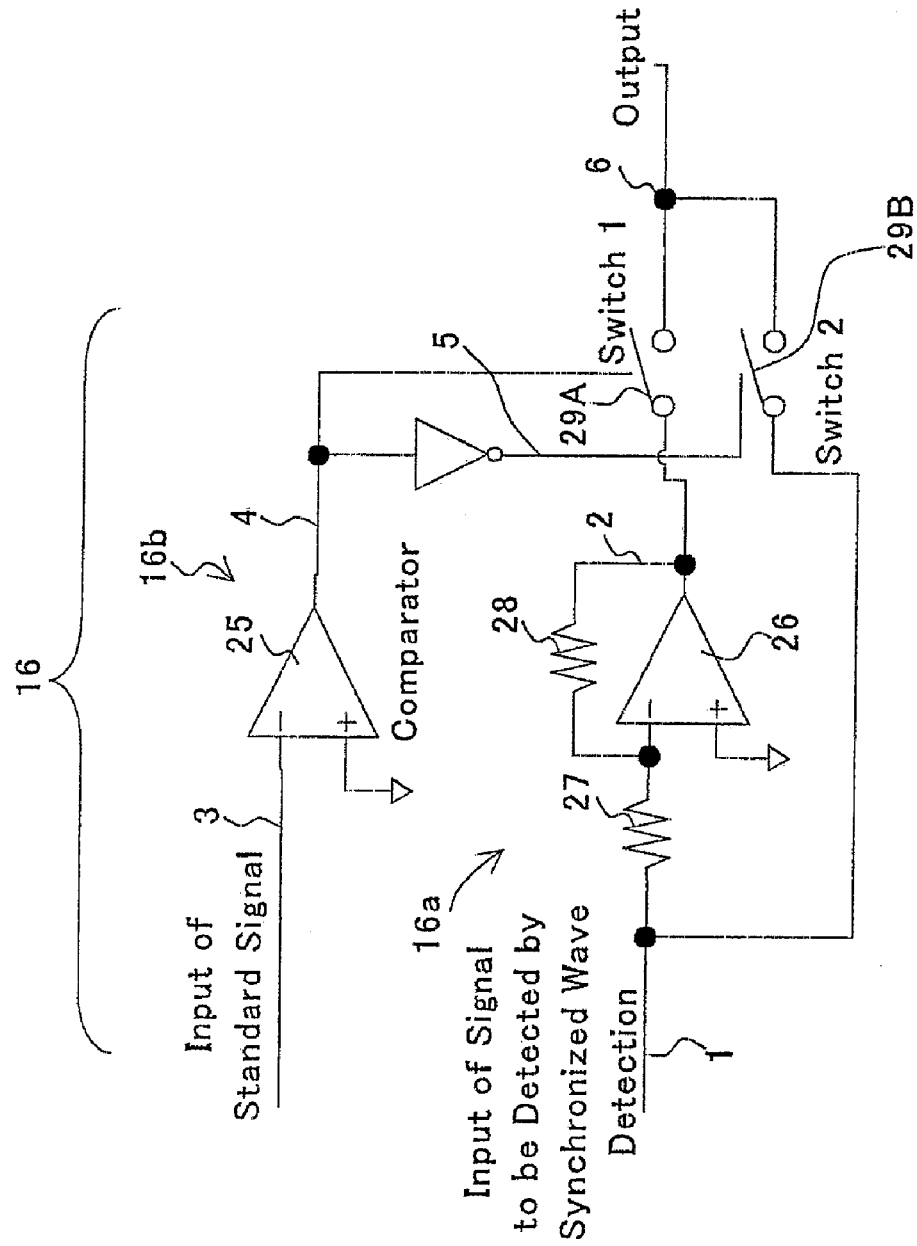
FIG. 6 is a circuit diagram showing a circuit for synchronized wave detection.
Figure 7:
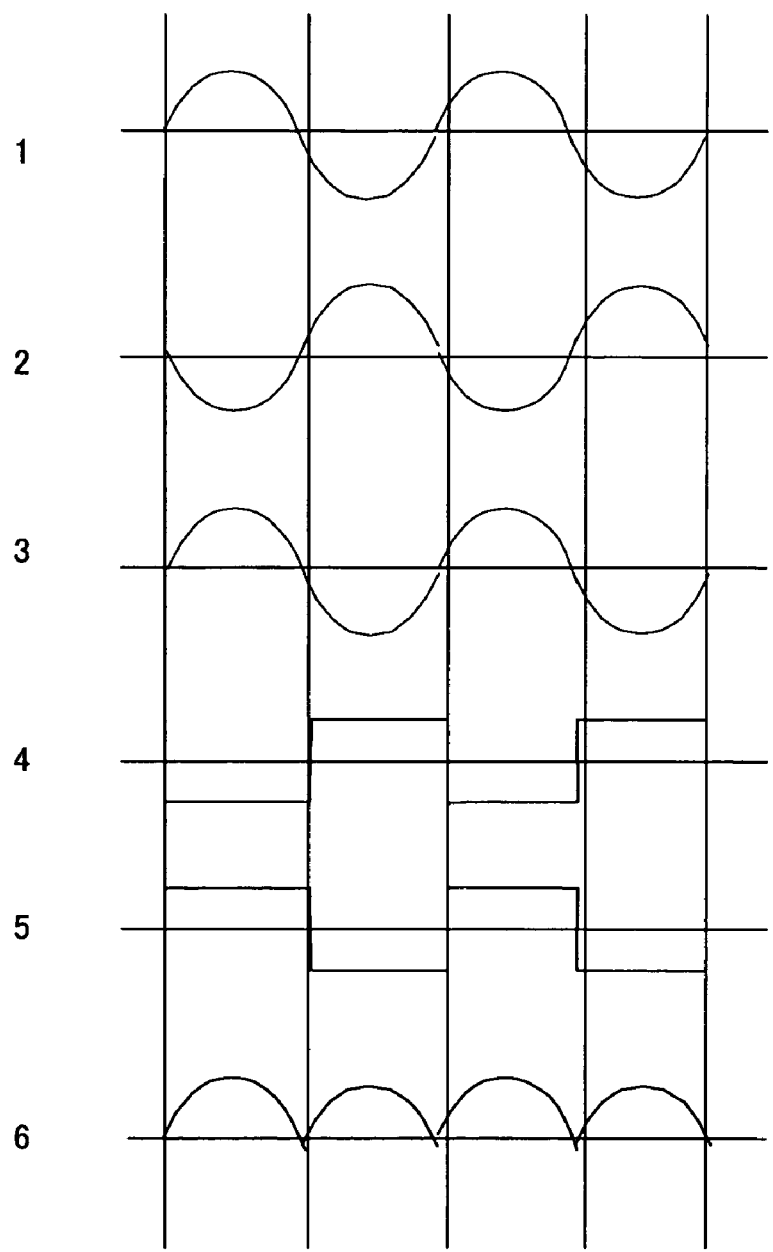
FIG. 7 is a diagram showing wave forms at points 1 to 6 in a circuit for synchronized wave detection shown in FIG. 6.

FIG. 6 is a circuit diagram showing a circuit 16 for synchronized wave detection according to a prior art. FIG. 7 shows wave forms of voltage at points 1 to 6 in the circuit of FIG. 6. A signal to be detected with synchronized wave detection is input to a unit 16a for inputting a signal to be detected (point 1). The signal has a wave form of, for example, sine wave shown in (1) of FIG. 7. The unit 16a for inputting the signal to be detected is substantially composed of an inverting amplifier and has a series resistance 27, a parallel resistance 28 and an amplifier 26. As a result, the phase of sine wave at the point 1 is inverted as shown as (2) of FIG. 7 at the point 2. The output is connected to an output point 6 of the detection circuit through a switch 1 (29A) and a switch 2 (29B).

On the other hand, a standard signal is input from a unit 16b for inputting a standard signal. The signal at a point 3 is shown as (3) of FIG. 7. The signal is passed through a comparator 25 so that the wave form is changed to rectangular wave at a point 4. The wave form of the rectangular wave at the point 4 is inverted at a point 5. The on-off of the switch 1 and on-off of the switch 2 are switched at a predetermined interval to obtain an output at the point 6.

Figure 8:
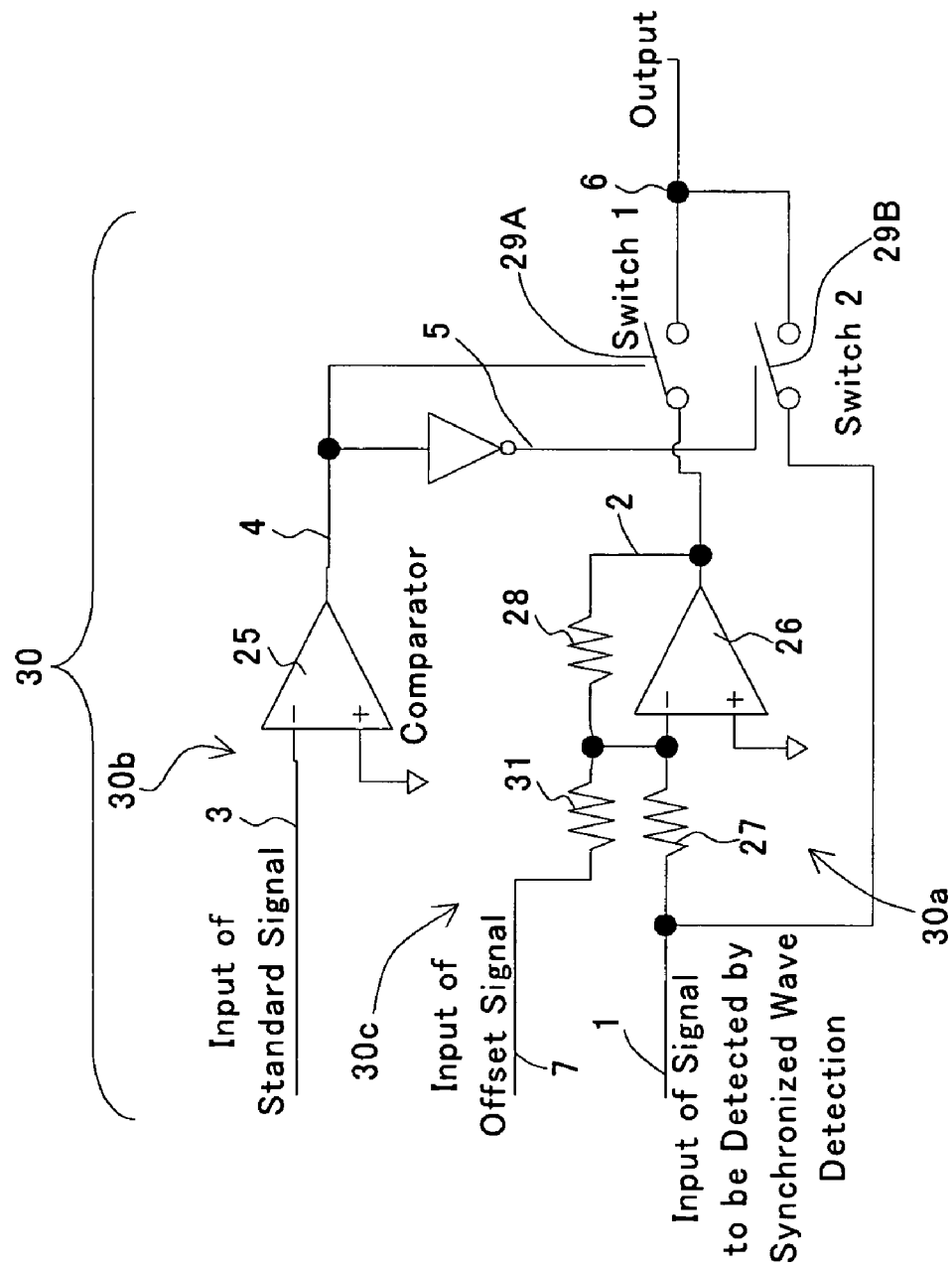
FIG. 8 is a circuit diagram showing a circuit for synchronized wave detection having a function of inputting an offset signal.
Figure 9:
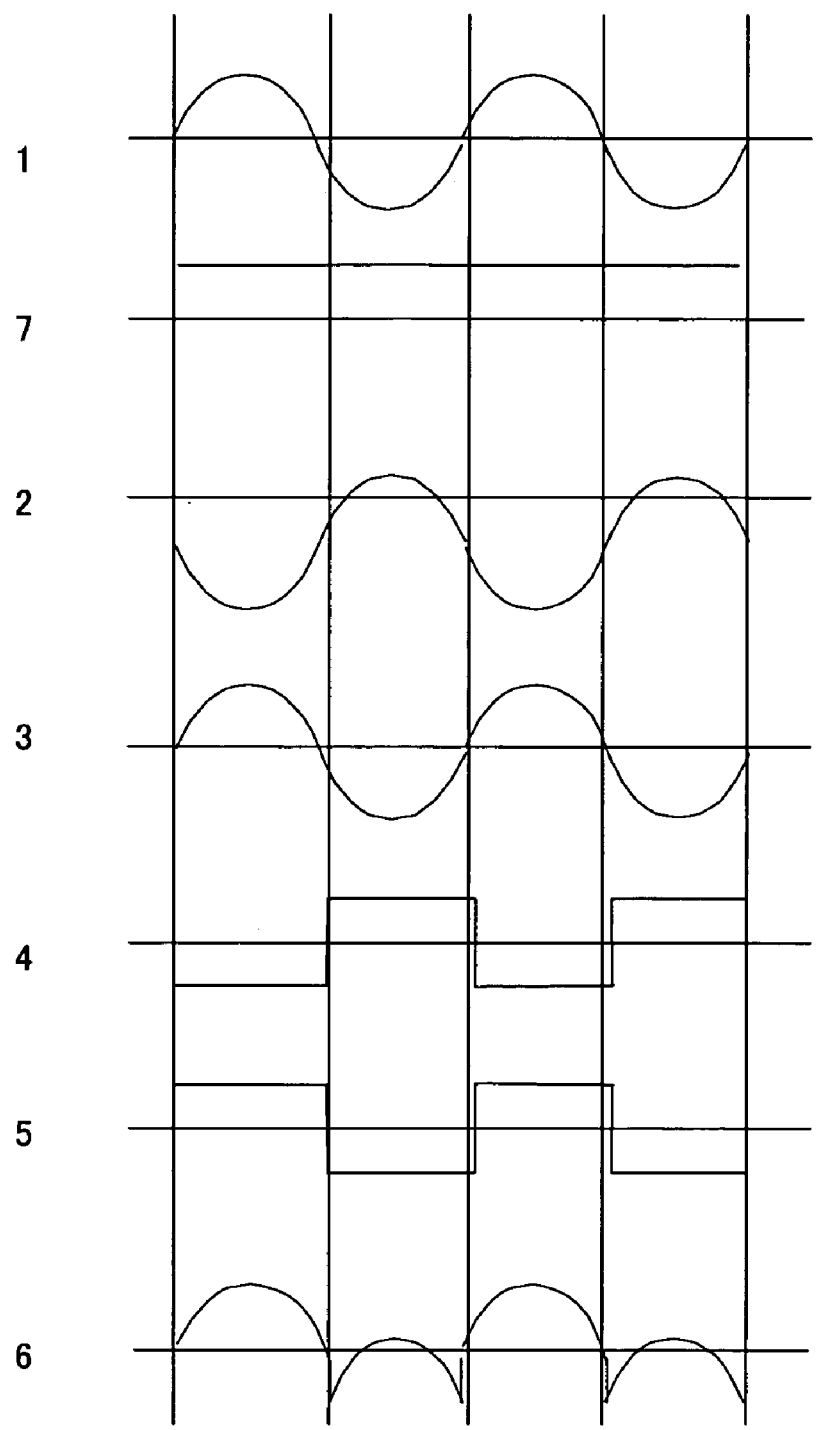
FIG. 9 shows examples of waveforms at points 1 to 7 in the circuit shown in FIG. 8.

FIG. 8 is a circuit diagram showing a detection circuit 30 having a function of inputting an offset signal according to one embodiment of the present invention, and FIG. 9 shows examples of wave forms at points in the circuit of FIG. 8.

The signal to be detected is input to the unit 30a for inputting signal to be detected (point 1). The wave form at the point 1 is, for example, sine wave shown as (1) in FIG. 9. The unit 30a for inputting signal to be detected is substantially composed of an inverting amplifier and has a serial resistance 27, a parallel resistance 28 and an amplifier 26. As a result, the sine wave at the point 1 is inverted at the point 2 as shown as (2) in FIG. 9. The output is connected to the output point 6 of the detection circuit through the switch 1 (29A) and a switch 2 (29B).

On the other hand, the standard signal is input from a unit 30b for inputting standard signal. The signal at the point 3 is shown as (3) in FIG. 9. After the signal is passed through the comparator 25, the waveform is changed to rectangular wave at the point 4. Further, the wave form of the rectangular wave at the point 4 is inverted at the point 5.

According to the present example, an offset signal is input from an offset signal input unit 30c through a resistance 31. The offset signal is a signal of direct current as shown in (7) in FIG. 9. The magnitude of the offset signal is decided depending on, for example, the magnitude (zero point temperature drift) from a detection electrode on a vibrator when the vibrator is not turned. The on and off and the switch 1 and on and off of the switch 2 are switched at a predetermined interval. The output is thus obtained at the point 6. The offset signal is input when the switch 1 is on and not input when the switch 1 is off. As a result, the wave form at the output point 6 of the whole of the detection circuit is as shown in FIG. 9. That is, although the wave form of the whole circuit for detection itself is not substantially different from that of (6) in FIG. 7, the offset voltage signal is superimposed when the switch 1 is on and not superimposed when the switch 2 is on.

Figure 10:
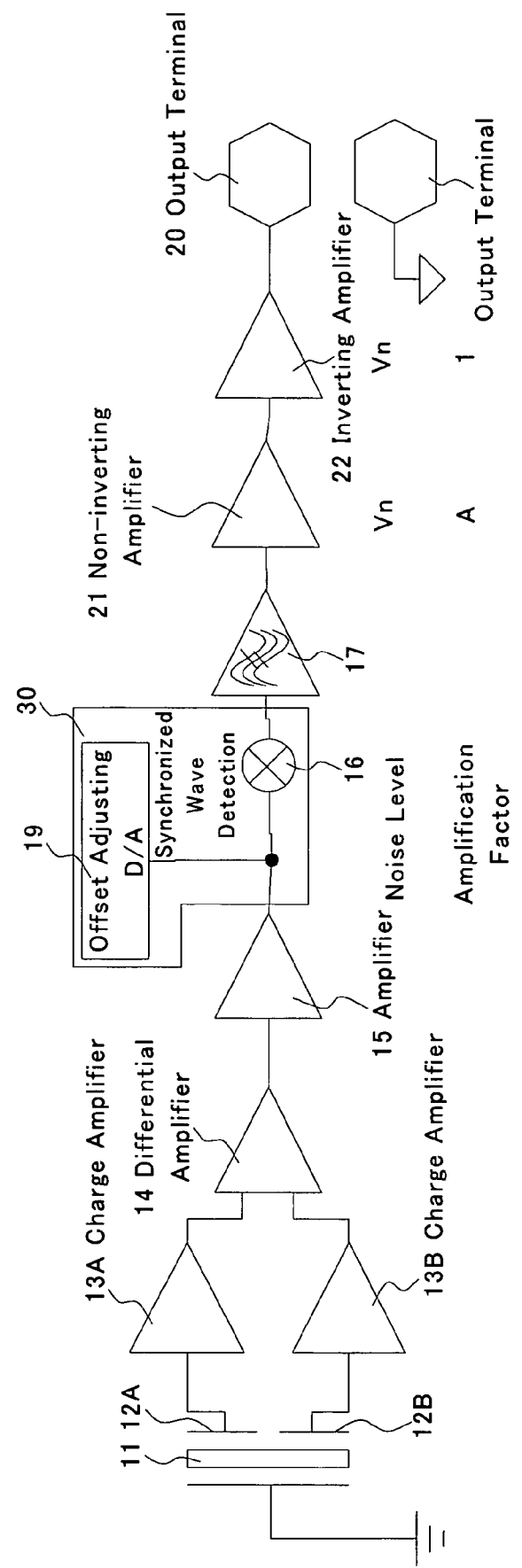
FIG. 10 is a block diagram showing a detection circuit equipped with a circuit 30 for synchronized wave detection and having a function of inputting an offset signal.

The following effects are obtained by superimposing a necessary offset signal on the circuit for synchronized wave detection. For example as shown in FIG. 10, the circuit 30 for synchronized wave detection having a function of inputting offset signal is provided in the downstream of an amplifier 15. The circuit 30 for synchronized wave detection has an offset adjusting unit 19 and a synchronized wave detection unit 16. The construction of the circuit 30 is shown, for example, in FIG. 8. The output signal including the offset signal after the detection is obtained in the circuit 30 as described above. The signal is passed through a low pass filter 17, a non-inverting amplifier 21 and an inverting amplifier 22 and output into a terminal 20.

According to present example, the offset signal is input before the passage of the low pass filter, so that the range for inputting signal voltage into the amplifier 21 in the downstream is narrow ((6) of FIG. 9). It is possible to use a non-inverting amplifier 21 having a narrower range for input voltage as the amplifier. It is now provided that the amplification factor of the non-inverting amplifier 21 is assigned to "A" and the amplification factor in the inverting amplifier is assigned to 1, the 1/f noise becomes Vn×A+Vn×2=Vn×(A+2). When "A"=4, the noise is reduced to 6Vn.

Figure 11:
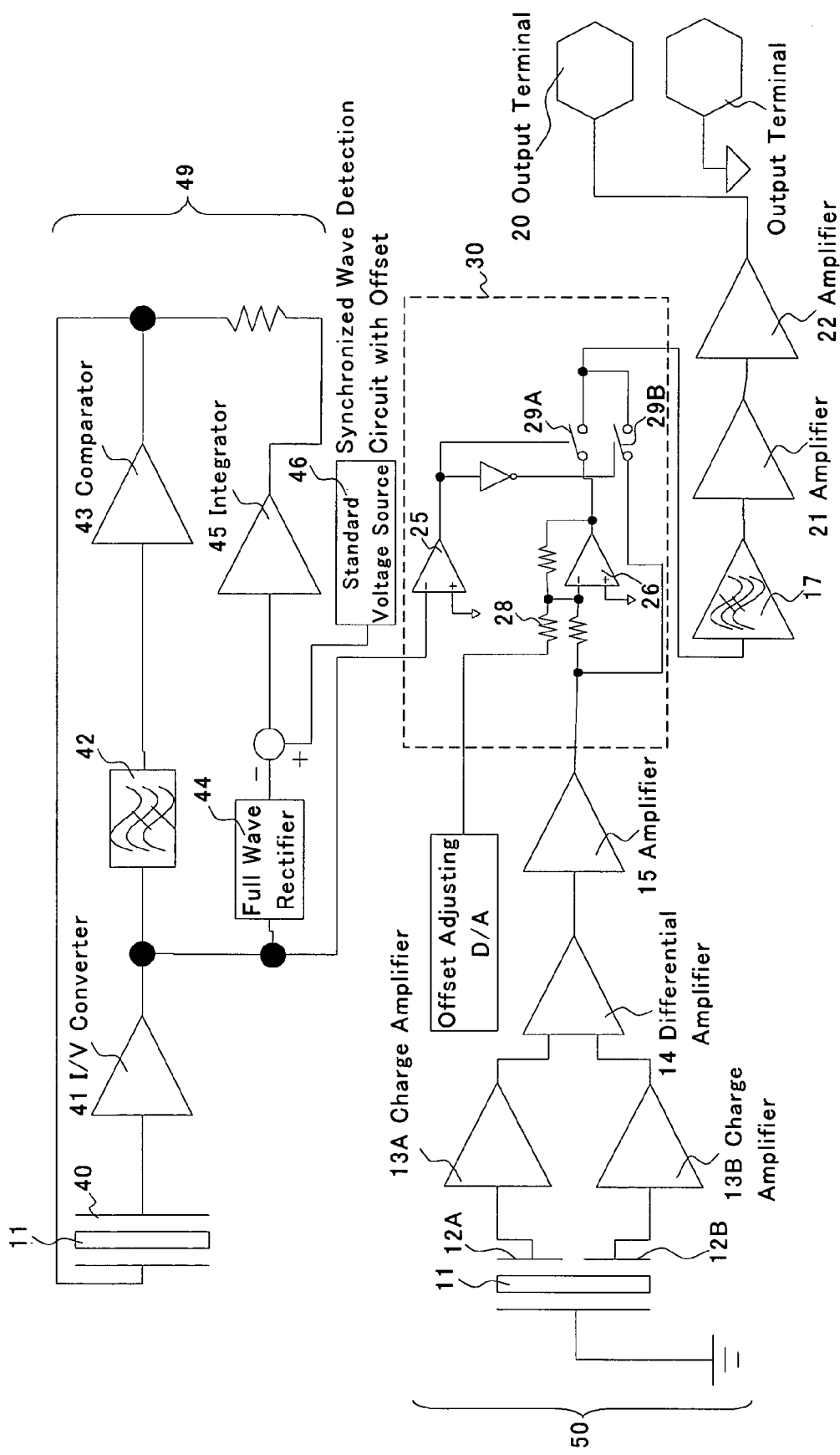
FIG. 11 is a circuit diagram showing a detection circuit 50 equipped with a circuit for synchronized wave detection having a function of inputting an offset signal and a self-oscillation circuit 49.

FIG. 11 is a circuit diagram showing a self-oscillating circuit 49 and detection circuit 50 according to one embodiment of the present invention.

An exciting means 40 is equipped with a vibrator 11 and connected with the self-oscillating circuit 49. The self-oscillating circuit 49 has a current/voltage amplifier (alternating current amplifier) 41, a high path filter 42, a comparator 43, a full wave rectifier 44, an integrator 45 and a resistor.

When the vibrator is activated, a noise is input from an activation circuit to the self-oscillating circuit 49. The noise passes through the driving vibration part 40 of the vibrator 11 and is subjected to frequency selection, and then input into the current/voltage converter 41 for the subsequent amplification to a voltage value. A part of the output signal from the current voltage amplifier 41 is drawn and input to the full wave rectifier 44 to convert the signal to the level (amplitude) value of the signal. 46 represents a standard voltage source. The signal of amplitude value is input to the integrator 45. The self-oscillating circuit 49 is connected to the diagnosis circuit, and the output of the diagnosis circuit is output through a DIAG terminal to the outside.

During the initial stage of the activation, most of the noise is cut at the vibrator 11 so that the full wave rectifier 44 gives a relatively low level of output. The output voltage at the integrator 45 is thus made large so that the loop gain during one passage of the oscillation loop is made larger than 1. As the output from the rectifier 44 becomes larger over time, the output voltage at the integrator 45 is made lower so that the loop gain is adjusted at 1.

Detection signals from detection means 12A and 12B provided on the vibrator 1 are amplified using charge amplifiers 13A, 13B, respectively, in the detecting circuit. The difference of the output signals is amplified with a differential amplifier 14, and then passed through the amplifier 15. On the other hand, a part of a driving signal is derived and the thus derived signal is supplied to a phase shifter 30 having a function of inputting offset signal to detect the output signal from the vibrator 11. The output signal after the detection is input into a low pass filter 17, non-inverting amplifier 21 and inverting amplifier 22, whose output is drawn to the outside through a terminal 22.

According to the present invention, the offset signal means a direct current output when the signal to be detected is zero. The offset signal is a signal for adjusting the measured amount at zero in a system for measuring physical quantity when the physical quantity is zero.

Although the wave form of the standard signal for the synchronized wave detection is not limited, the wave forms include sine, rectangular, chopping and saw tooth waves.

A physical quantity measured according to the present invention is not particularly limited. When a driving vibration is excited in a vibrator and the vibration state of the vibrator is changed due to the effects of a specific physical quantity exerted on the vibrator, the physical quantity is included in the present invention as far as the physical quantity can be detected through a detecting circuit. Such physical quantity may preferably be an acceleration, an angular acceleration or an angular velocity applied on a vibrator. The measuring system of the present invention may preferably be an inertia censor.

Although the waveform of the driving signal is not particularly limited, the waveform may preferably be sine, cosine or rectangular wave.

The construction of the vibrator is not particularly limited. The material forming the vibrator may preferably have a Q value of 3000 or higher and more preferably 10000 or higher. The material forming the vibrator includes a permanent elastic alloy such as elinvar or a ferroelectric (piezoelectric) single crystal. Such single crystal includes quartz, lithium niobate, lithium tantalite, lithium niobate-lithium tantalite solid solution, lithium borate and langasite.

EXAMPLES

A circuit of a comparative example described referring to FIGS. 1 and 11 was constructed for performing an experiment of driving and detection, as described below. A vibrator described in Japanese patent publication 11-281372A was used. The vibrator had two driving vibration arms and two detection vibration arms vibrating independently from the driving vibration arms. Noise in a frequency range of 100 to 500 kHz was generated from an activation circuit, and then input into the self-oscillating circuit to activate self-oscillating. The characteristic resonance frequency of the driving arms was 45 kHz and the cut-off frequency of the low pass filter was 200 Hz.

The 1/f noise was 10 μV/$\sqrt{Hz}$ (1 Hz) for the detection signal obtained from the detecting circuit.

Figure 1:
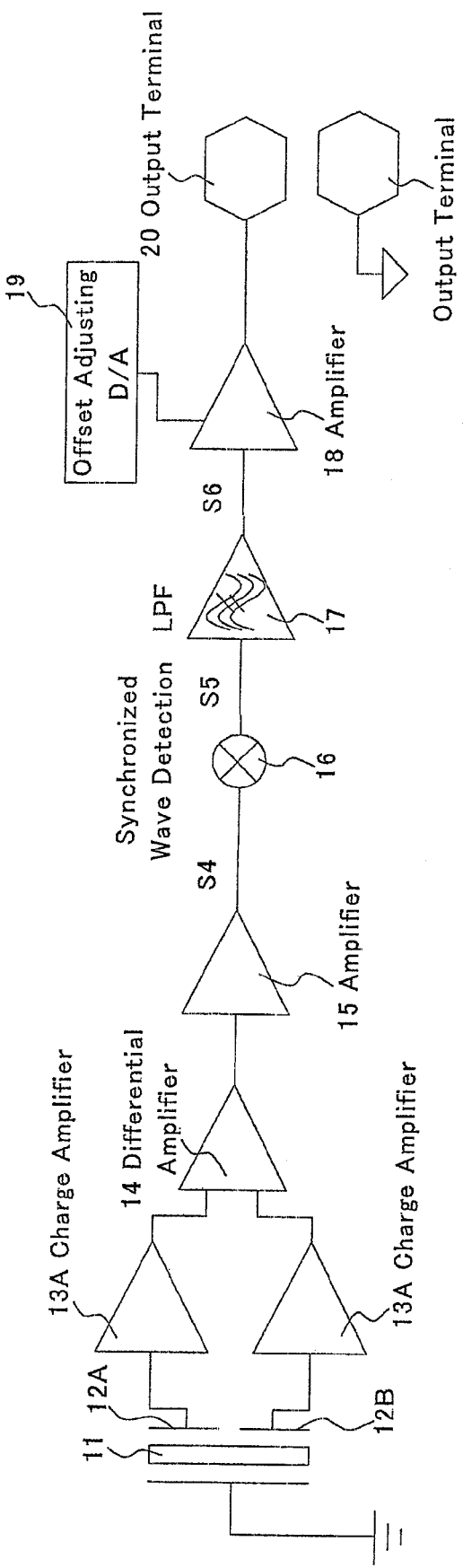
FIG. 1 is a circuit diagram showing a detection circuit of a prior art.
Figure 2:
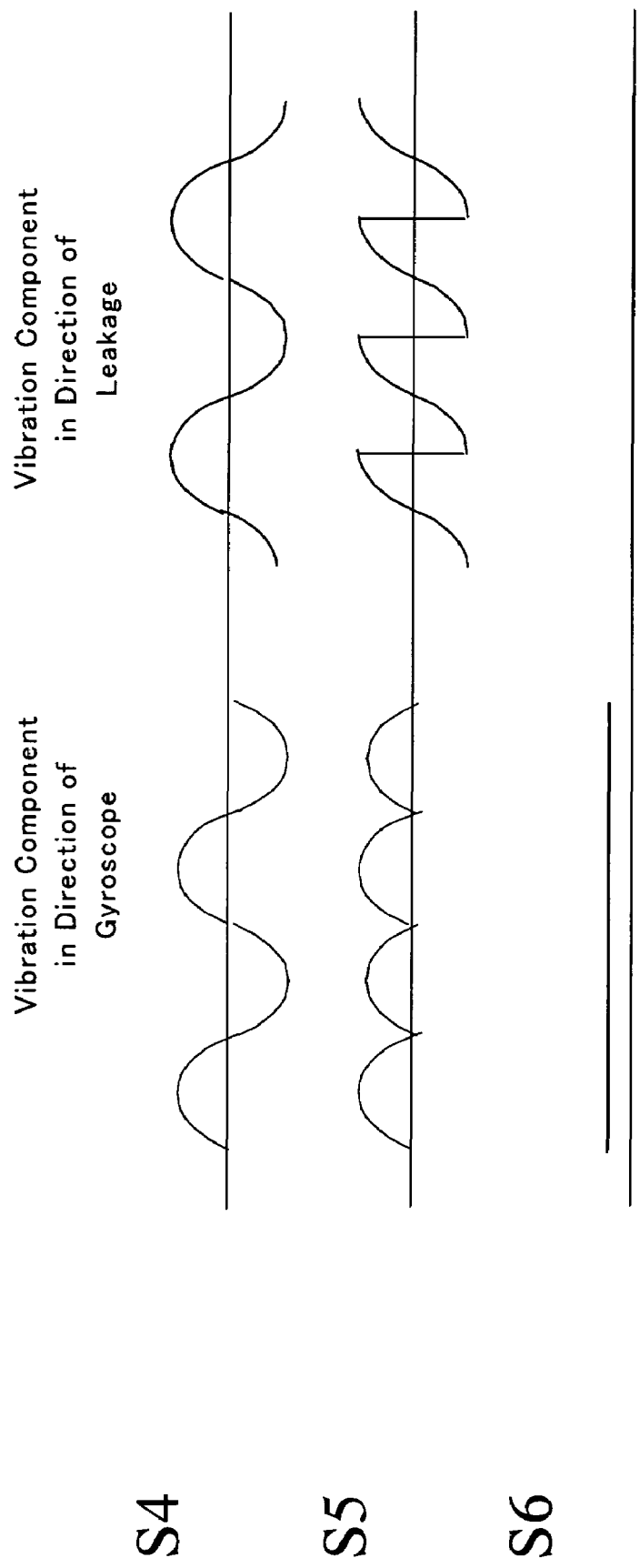
FIG. 2 is a diagram showing wave forms at points S4, S5 and S6.
Figure 3:
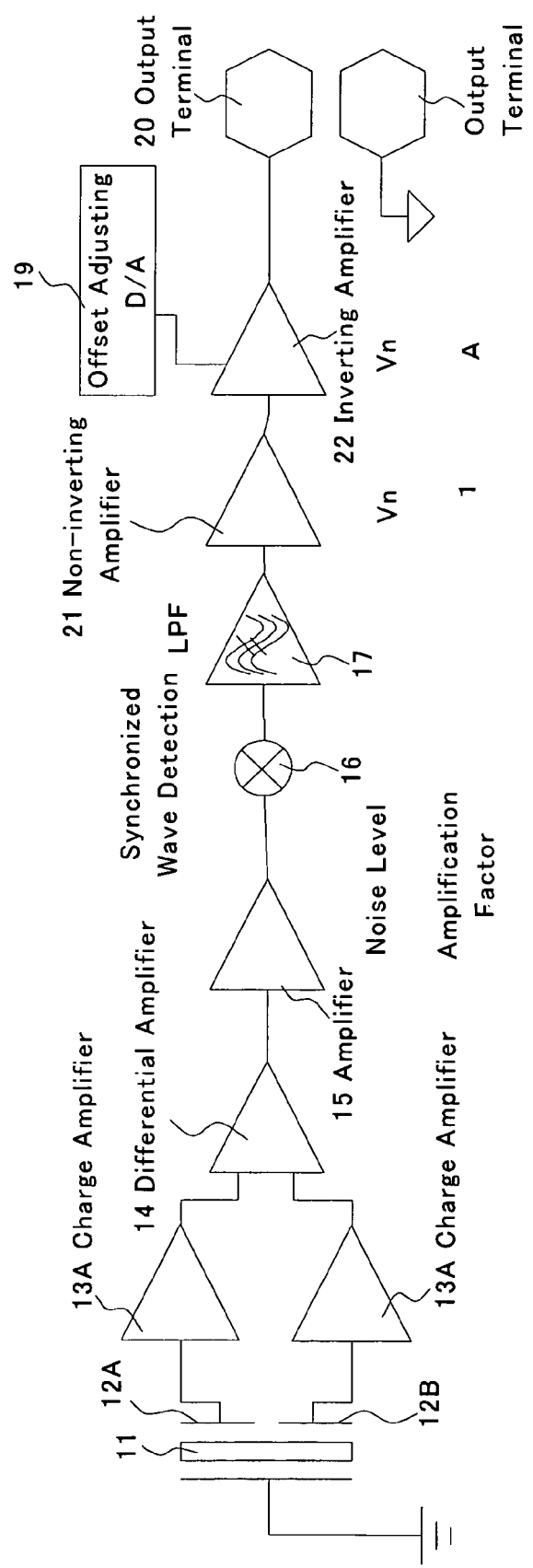
FIG. 3 is a circuit diagram showing a detection circuit according to a comparative example studied by the inventors.
Figure 5:
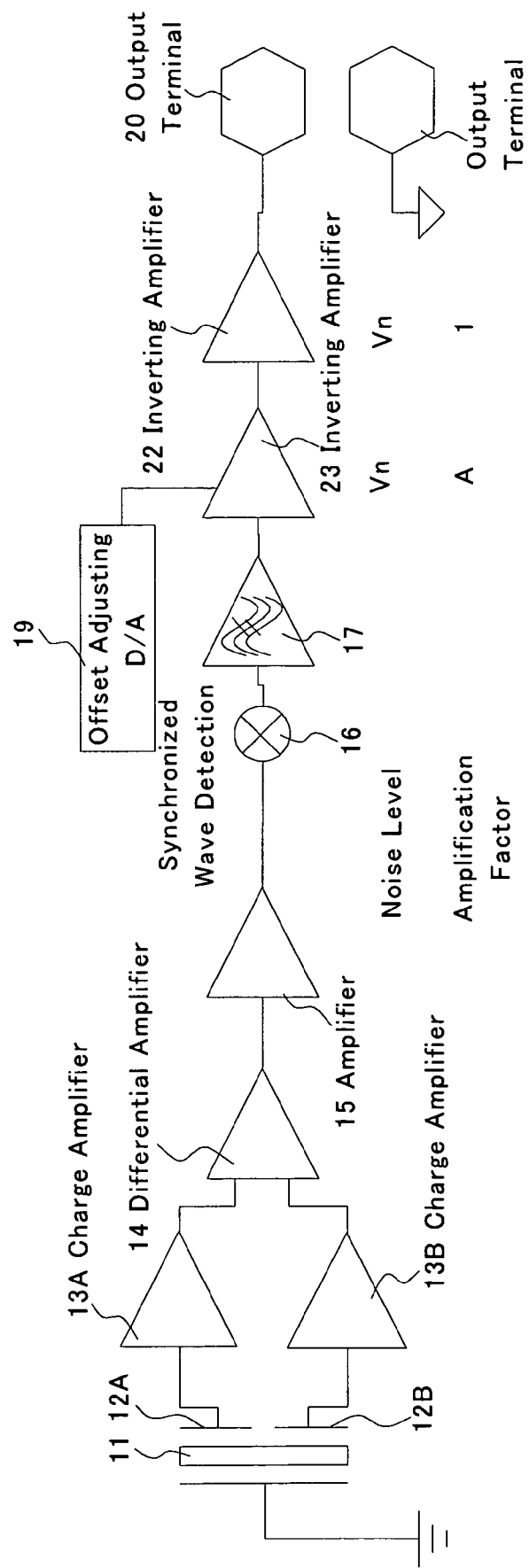
FIG. 5 is a circuit diagram showing a detection circuit according to another comparative example studied by the inventors.

On the other hand, the detecting circuit was changed to that shown in FIG. 8 in the detecting circuit shown in FIG. 1. As a result, the 1/f noise was reduced by 60 percent compared with that in the comparative example.

The invention claimed is:

1. A detection circuit comprising:
  a switch performing synchronized wave detection to obtain an output signal;
  an offset signal input unit superimposing a DC offset signal onto a signal to be detected by synchronized wave detection to create a combined signal of said signal to be detected and said offset signal;
  a unit inputting said combined signal, said unit being provided downstream of said offset signal input unit and upstream of said switch;
  a standard signal input unit inputting a standard signal for said signal to be detected, said standard signal input unit being connected to said switch;
  an output terminal receiving said output signal, said output terminal being provided downstream of said switch and receiving said output signal,
  wherein said combined signal is subjected to synchronized wave detection based on said standard signal after said DC offset signal is superimposed on said signal to be detected.

2. A detection method comprising the steps of:
  superimposing a DC offset signal on a signal to be detected by synchronized wave detection to create a combined signal of said signal to be detected and said offset signal;

then subjecting said combined signal to synchronized wave detection based on a standard signal to obtain an output signal; and then sending said output signal to an output terminal.

3. A system for measuring a physical quantity based on a detection signal using a vibrator, a driving circuit exciting a driving vibration in said vibrator and a detecting circuit outputting said detection signal from said vibrator, said detecting circuit comprising a wave detection circuit comprising:

a switch performing synchronized wave detection to obtain an output signal;

an offset signal input unit superimposing a DC offset signal onto a signal to be detected by synchronized wave detection to create a combined signal of said signal to be detected and said offset signal, a unit, inputting said combined signal said unit being provided downstream of said offset signal input unit and upstream of said switch;

a standard signal input unit, inputting a standard signal for said signal to be detected, said standard signal input unit being connected to said switch;

an output terminal receiving said output signal, output terminal being provided downstream of said switch and receiving said output signal, wherein said combined signal to be detected is subjected to synchronized wave detection based on said standard signal after said DC offset signal is superimposed on said signal to be detected.

4. The system of claim 3 for measuring a turning angular rate.

5. The system recited in claim 3, wherein said standard signal comprises a portion of a driving signal exciting said driving vibration in said vibrator.

6. The system recited in claim 3, wherein said wave detection circuit further comprises a low pass filter, a non-inverting amplifier and an inverting amplifier between said switch and said output terminal.

* * * * *